United States Patent
Miyamoto

(10) Patent No.: US 7,437,456 B1
(45) Date of Patent: Oct. 14, 2008

(54) OBJECT REFERENCE GENERATING DEVICE, OBJECT REFERENCE GENERATING METHOD AND COMPUTER READABLE RECORDING MEDIUM FOR RECORDING AN OBJECT REFERENCE GENERATING PROGRAM

(75) Inventor: Yoshiko Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 545 days.

(21) Appl. No.: 09/710,837

(22) Filed: Nov. 14, 2000

(30) Foreign Application Priority Data

Mar. 17, 2000 (JP) .............................. 2000-077124

(51) Int. Cl.
*G06F 15/173* (2006.01)
*G06F 15/16* (2006.01)

(52) U.S. Cl. ...................... 709/225; 709/223; 709/226; 709/245

(58) Field of Classification Search ......... 709/223–229, 709/245–246
See application file for complete search history.

(56) References Cited

U.S. PATENT DOCUMENTS

| | | | | |
|---|---|---|---|---|
| 6,061,349 A * | 5/2000 | Coile et al. ................. 370/389 |
| 6,092,178 A * | 7/2000 | Jindal et al. ................... 712/27 |
| 6,128,279 A * | 10/2000 | O'Neil et al. ............... 370/229 |
| 6,209,018 B1 * | 3/2001 | Ben-Shachar et al. ....... 718/105 |
| 6,321,261 B1 * | 11/2001 | Glass .......................... 709/223 |
| 6,324,177 B1 * | 11/2001 | Howes et al. ............... 370/389 |
| 6,324,580 B1 * | 11/2001 | Jindal et al. .................. 709/228 |
| 6,327,622 B1 * | 12/2001 | Jindal et al. .................. 709/228 |
| 6,330,598 B1 * | 12/2001 | Beckwith et al. ............ 709/223 |
| 6,363,077 B1 * | 3/2002 | Wong et al. .................. 370/422 |
| 6,363,411 B1 * | 3/2002 | Dugan et al. ................ 709/202 |
| 6,425,005 B1 * | 7/2002 | Dugan et al. ................ 709/223 |
| 6,434,618 B1 * | 8/2002 | Cohen et al. ................ 709/228 |
| 6,456,597 B1 * | 9/2002 | Bare ........................... 370/252 |
| 6,466,974 B1 * | 10/2002 | Nelson et al. ............... 709/223 |
| 6,470,388 B1 * | 10/2002 | Niemi et al. ................ 709/224 |
| 6,473,403 B1 * | 10/2002 | Bare .......................... 370/236 |
| 6,499,063 B1 * | 12/2002 | Chessell et al. ............. 719/315 |
| 6,519,643 B1 * | 2/2003 | Foulkes et al. .............. 709/227 |
| 6,556,541 B1 * | 4/2003 | Bare .......................... 370/235 |
| 6,577,600 B1 * | 6/2003 | Bare .......................... 370/238 |
| 6,578,068 B1 * | 6/2003 | Bowman-Amuah ......... 709/203 |
| 6,580,715 B1 * | 6/2003 | Bare .......................... 370/396 |
| 6,629,128 B1 * | 9/2003 | Glass ......................... 709/203 |
| 6,687,761 B1 * | 2/2004 | Collins et al. ............... 719/315 |
| 6,694,368 B1 * | 2/2004 | An et al. ..................... 709/227 |
| 6,779,017 B1 * | 8/2004 | Lamberton et al. .......... 709/203 |
| 6,804,711 B1 * | 10/2004 | Dugan et al. ................ 709/223 |

* cited by examiner

*Primary Examiner*—Jason Cardone
*Assistant Examiner*—Thomas Duong
(74) *Attorney, Agent, or Firm*—Staas & Halsey LLP

(57) ABSTRACT

A naming service in CORBA is provided to a client with a high degree of reliability regardless of the operating format or network format. There are provided, an ORB for receiving a request from a client connected via a network, an apportioning server, and a network to acquire an object reference in order to be provided with an object, and a naming service section for generating an object reference by dynamically setting address information included in the object reference, in accordance with connection information at the time of the request.

9 Claims, 14 Drawing Sheets

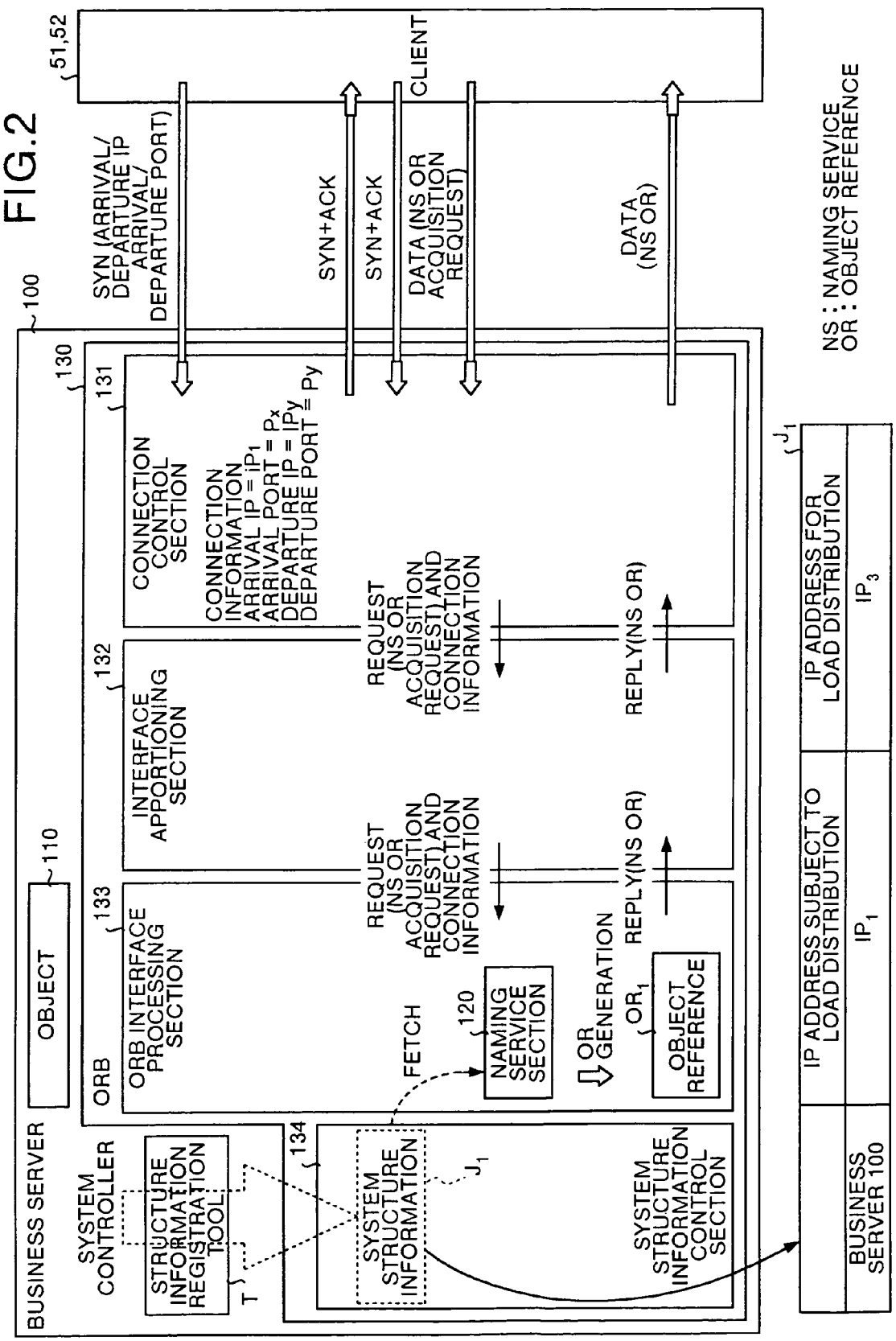

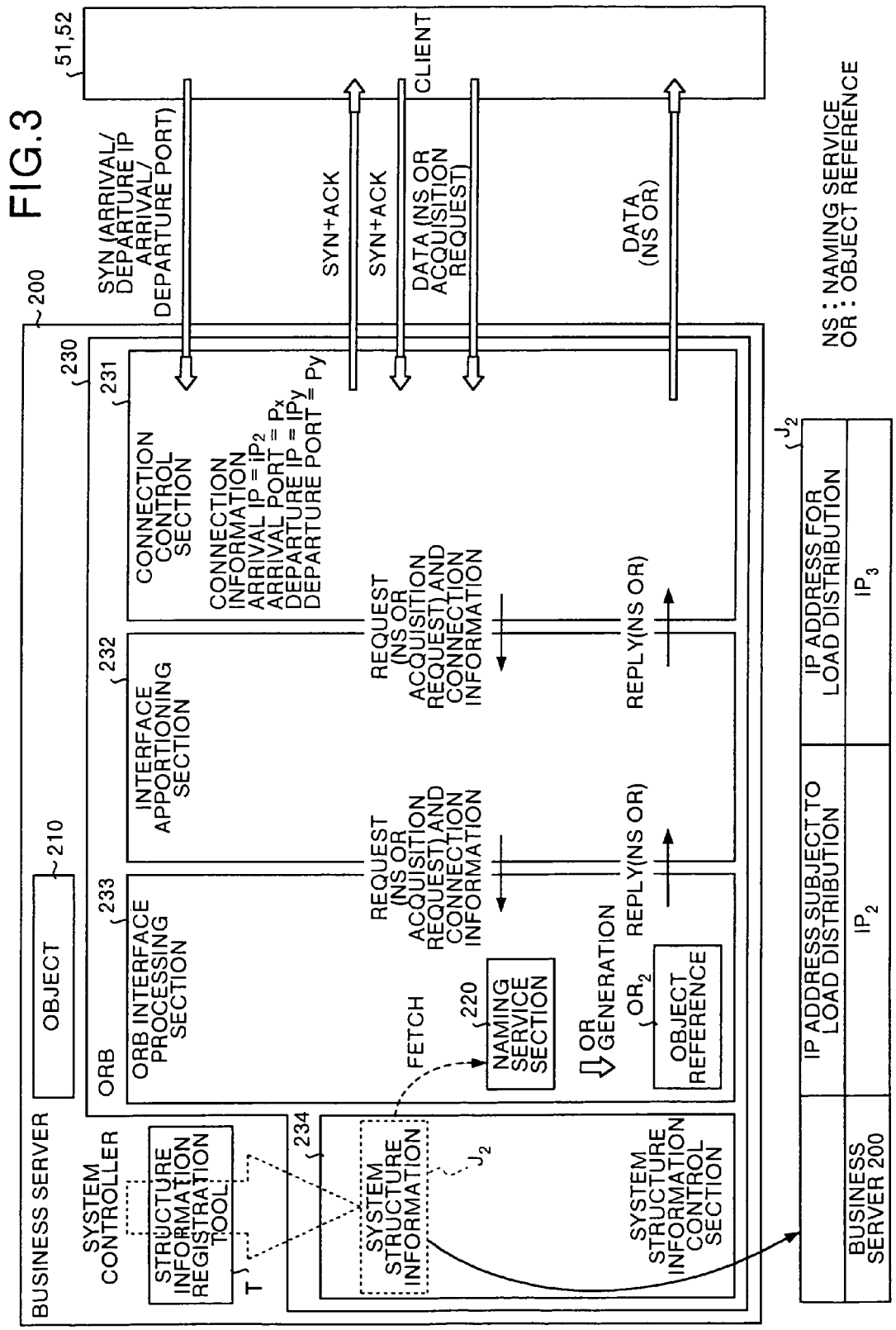

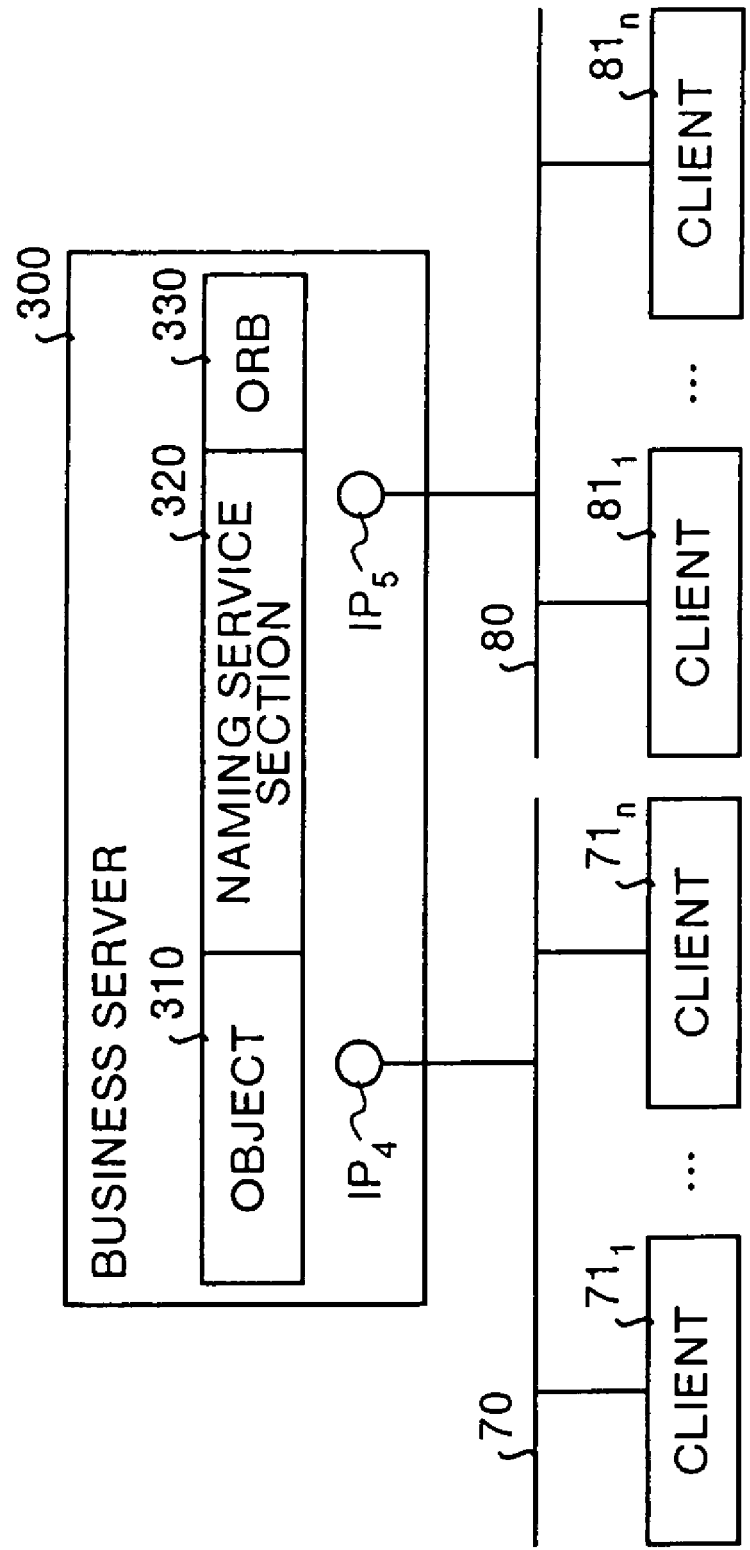

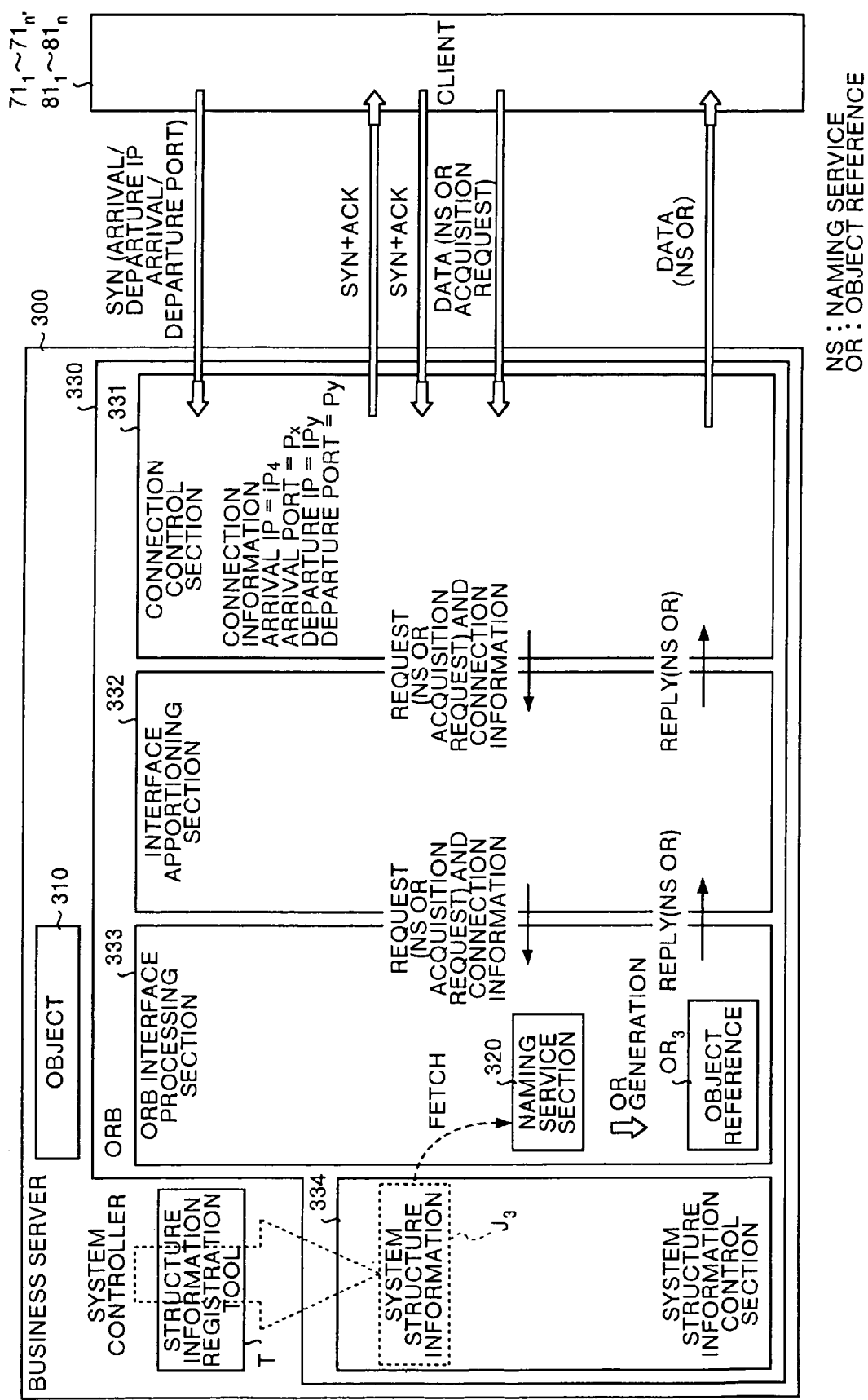

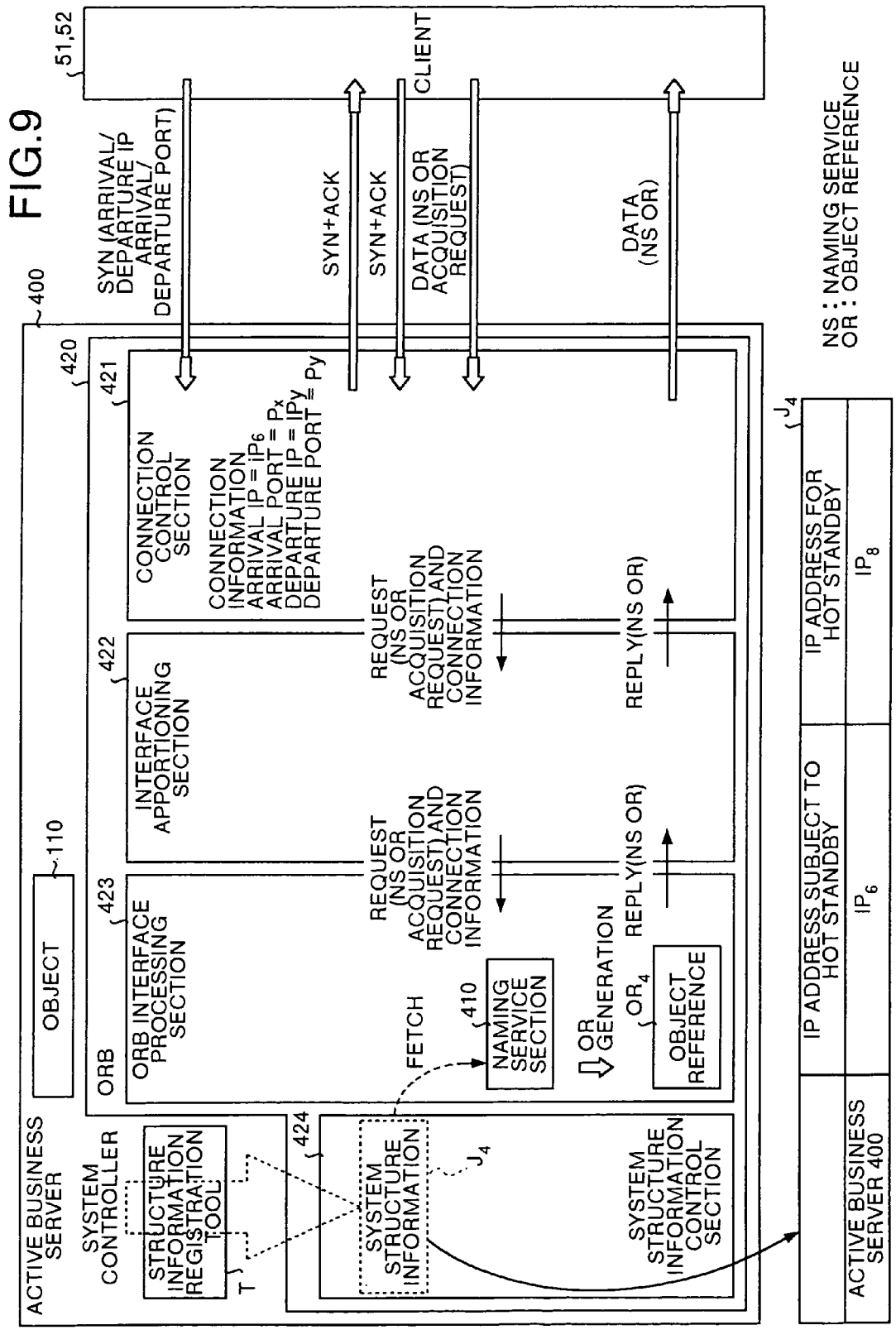

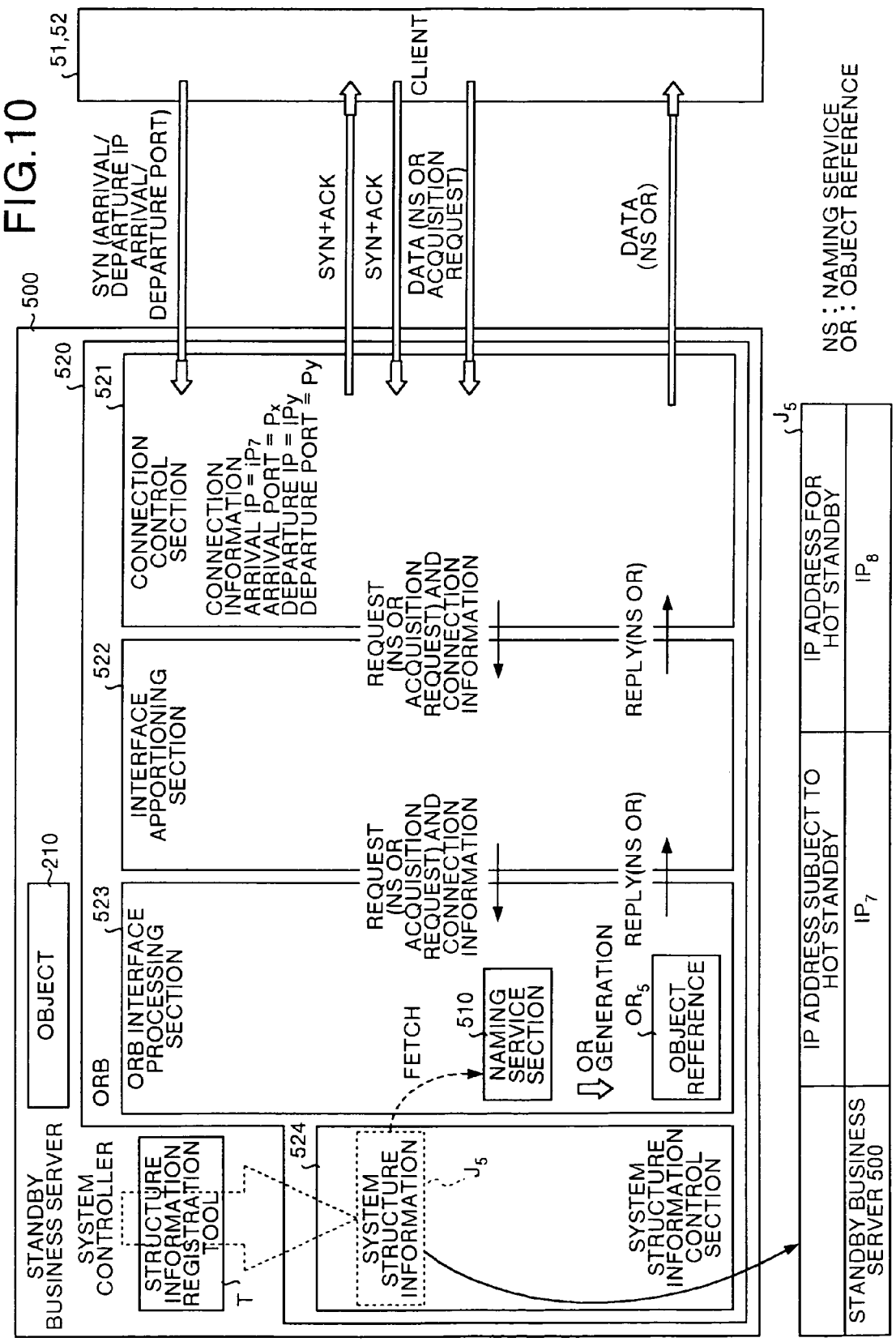

OBJECT REFERENCE GENERATING DEVICE, OBJECT REFERENCE GENERATING METHOD AND COMPUTER READABLE RECORDING MEDIUM FOR RECORDING AN OBJECT REFERENCE GENERATING PROGRAM

FIELD OF THE INVENTION

The present invention relates to an object reference generating device, for generating an object reference in CORBA (Common Object Request Broker Architecture), an object reference generating method, and a computer readable recording medium for recording an object reference generating program, and particularly, to an object reference generating program for providing a client with a naming service in CORBA that has a high degree of reliability regardless of the operating format or network format, an object reference generating method, and a computer readable recording-medium for recording an object reference generating program.

BACKGROUND OF THE INVENTION

In recent years, the environment surrounding business information systems has greatly changed along with the rapid advances in internet technology as represented by the WWW (World Wide Web). In particular, recently, cooperation over a wide range exceeding that common hitherto has begun in the form of cooperation with business internal systems, group businesses and other businesses, and cooperation with general consumers aimed at improving customer service and improving the efficiency of business activity.

In a business information system supporting business activity, a rapid response to the aforementioned extreme changes in the business environment is desired. In this case, when adopting a technique for carrying out the complete reconstruction of a business information system, because of the barriers of development time and cost, it is difficult to respond quickly to extreme environmental changes. Therefore, in order to respond to extreme environmental changes, it is necessary to add items necessary to the new objectives as the occasion demands, while making effective use of existing assets. It is also necessary to select the optimum materials (vendor, hardware, software) at any particular time and for the existing system and the new system to have a common basis.

In order to obtain this common base, it is vital for the materials of the existing system and the materials of the new system to work in cooperation with each other without being conscious of any differences between them. Moreover, in the field of network computing, new technologies are being developed continuously and it is necessary that these new technologies can be dealt with flexibly. Because of this background, recently, attention has been focused on object-oriented technologies such as CORBA and the like which is a standard for distributed system architecture as a common basis for achieving cooperation between various computing environments.

CORBA is a standardized specification for connection between different varieties of equipment determined by a standardization OMG (Object Management Group), and regulates various types of API (Application Program Interface) for distributed application architecture and cooperation protocols between different varieties of equipment. Simply put, CORBA is a standard technology for providing a mechanism for a client to access an object (for example, an application program) in a server in a distributed system environment. In this case, the term object in CORBA means an entity identifiably encapsulated for providing either one or a plurality of services that can be requested by a client.

FIG. 12 is a block diagram showing a structural example 1 of a conventional object reference generating system that uses CORBA. In this diagram, business servers 10 and 20 are separately provided so as to distribute the load in response to accesses from a client 51 and a client 52 and provide the same service to the client 51 and the client 52. The business server 10 is connected to a network 30 and provides the object 11 (for example, an application program) to the clients 51 and 52. The TCT/IP (Transmission Control Protocol/Internet Protocol) IP address $IP_1$ is allocated to the business server 10.

A naming service section 12 provides a naming service in CORBA to the clients 51 and 52, and has the function of controlling the object 11 by name. By using this naming service, when the clients 51 and 52 access the object 11, the access is possible using the name and not the position of the object 11, therefore it is not necessary to be conscious of the physical position of the object 11.

Specifically, when access is made by the client 51 (or the client 52), the naming service 12 generates an object reference and returns this to the client 51 (or client 52) thus providing a naming service. This object reference is information for uniformly identifying objects by name and has the format F shown in FIG. 13.

As is shown in FIG. 13, the object reference is constructed from information consisting of "IOR (Interoperable Object Reference) header", "ID" (IDentification), "host name" (IP address), "PORT number", "object key", "tag component", and "other profile". IOR header is header information for the object reference. ID is an identifier for identifying the object reference.

Host name (IP address) is the name of the host having the object, specifically, the IP address of the server. PORT number is the port number for specifying an object within the server. Object key is information for uniformly specifying objects within a server. Returning to FIG. 12, the ORB (Object Request Broker: a mechanism for communicating between distributed objects) 13 is a software bus for acting as an intermediary between the business server 10 and the clients 51 and 52. The ORB 13 has an initial object reference that includes its own IP address and PORT number.

The business server 20 cooperates with the business server 10 to distribute the load and is connected to the network 30. The structure of the business server 20 is the same as that of the business server 10. Namely, each of the object 21, the naming service section 22, and the ORB 23 in the business server 20 is provided with the same functions as the object 11, the naming service section 12, and the ORB 13 in the business server 10. The IP address $IP_2$ is allocated to the business server 20.

The apportioning server 40 is designed to achieve a load distribution and is interposed between the network 30 and the network 50. The apportioning server 40 has a supervisory function of supervising the respective loads on the business server 10 and the business server 20, as well as an apportioning function of apportioning accesses from the client 51 (or the client 52) to the server with the lighter load out of the business server 10 and the business server 20. The IP address $IP_3$ is allocated to the apportioning server 40. The client 51 and the client 52 are connected to the network 50 and access the business server 10 or the business server 20 through the network 50, the apportioning server 40, and the network 30.

In the above structure, when there is an access request from the client 51, the access from the client 51 is apportioned by the apportioning server 40, for example, to the business server 10, which has a lighter load than the business server 20. As a result, the client 51 establishes a connection with the business server 10 after acquiring the ORB 13 object reference.

Next, the client 51 requests an object reference of the naming service section 12 from the naming service section 12. As a result, the naming service section 12 generates an object reference including at least the "host name" (IP address)=IP address $IP_1$ and the "PORT number" shown in FIG. 13, and notifies this to the client 51. The IP address in the object reference of the naming service section 12 is always IP address $IP_1$.

After receiving the object reference of the naming service section 12, the client 51 acquires the IP address $IP_1$ and the PORT number of the naming service section 12 and then establishes a connection with the naming service section 12. Next, the client 51 requests an object reference of the object 11 using this connection. When this object reference is received, the client 51 acquires the IP address IP and the PORT number from the object reference and establishes a connection with the object reference 11. Thereafter, the client 51 receives distributions of the object 11 using this connection.

FIG. 14 is a block diagram showing a structural example 2 of a conventional object reference generating system that uses CORBA. This diagram shows an object reference generating system provided with: a single business server 60; a first group network 70 and a second group network 80 that are independent of each other; clients $71_1$ to $71_n$ who are connected to the first group network 70 and form the first group; and clients $81_1$ to $81_n$ who are connected to the second group network 80 and form the second group.

In this diagram, the business server 60 provides service to the clients $71_1$ to $71_n$ and the clients $81_1$ to $81_n$ and is connected to both the first group network 70 and the second group network 80. The IP address $IP_4$ and the IP address $IP_5$ are both allocated to the business server 60. The IP address $IP_4$ corresponds to the first group network 70 and the IP address $IP_5$ corresponds to the second group network 80.

The structure of the business server 60 is the same as that of the business server 10 (see FIG. 12). Namely, the object 61, the naming service section 62, and the ORB 63 of the business server 60 are provided with the same functions as the object 11, the naming service section 12, and the ORB 13 shown in FIG. 12.

In the above structure, a client $71_1$ accesses the IP address $IP_4$ via the first group network 70. As a result, after acquiring the object reference of the ORB 63, the client $71_1$ established a connection with the business server 60. Next, the client $71_1$ requests an object reference of the naming service section 62 from the naming service section 62. As a result, the naming service section 62 generates an object reference including at least the "host name" (IP address)=IP address $IP_4$ and the PORT number shown in FIG. 13, and notifies this to the client $71_1$. The IP address in the object reference of the naming service section 62 is IP address $IP_4$.

After receiving the object reference of the naming service section 62, the client $71_1$ acquires the IP address $IP_4$ and the PORT number of the naming service section 62 and then establishes a connection with the naming service section 62. Next, the client $71_1$ requests an object reference of the object 61 using this connection. When this object reference is received, the client $71_1$ acquires the IP address $IP_4$ and the PORT number from the object reference and establishes a connection with the object reference 61. Thereafter, the client $71_1$ receives distributions of the object 61 using this connection.

As described above, an example of load distribution was described in FIG. 12, however, in actual fact, in a conventional object reference generating system, the problem has existed that it has not been possible to distribute the load. Namely, in order to achieve load distribution, the client 51 needs to access the IP address $IP_3$ of the apportioning server 40.

However, because the IP address of the object reference generated in the naming service section 12 is IP address $IP_1$ and not IP address $IP_3$ for load distribution, the apportioning server 40 is not able to distribute the load. Accordingly, conventionally, the problems have existed that not only has it not been possible to increase reliability by load distribution, but also it has not been possible to provide a naming service in CORBA in a load distributed environment.

Moreover, in FIG. 14, an example was described in which there were provided a business server 60 having an IP address $IP_4$ and an IP address $IP_5$ and a first group network 70 and a second group network 80 which were both independent of each other. However, in actual fact, in a conventional object reference generating system, there are cases when the clients $71_1$ to $71_n$ and the clients $81_1$ to $81_n$ are not able to receive the services of the naming service.

Namely, when an access is made from any one of the clients $71_1$ to $71_n$ and when the IP address of the object reference generated in the naming service section 62 is IP address $IP_4$, the client is able to establish a connection with the object 61 through the first group network 70 and the IP address $IP_4$.

However, when an access is made from any one of the clients $71_1$ to $71_n$, and when the IP address of the object reference generated in the naming service section 62 is the other IP address $IP_5$, the problem arises that, because the first group network 70 does not correspond to the IP address $IP_5$, the client is not able to establish a connection with the object 61.

SUMMARY OF THE INVENTION

It is an object of the present invention to provide an object reference generating device capable of providing a naming service in CORBA to a client with a high degree of reliability regardless of the operating format or network format, as well as an object reference generating method, and a computer readable recording medium on which an object reference generating program is recorded.

In order to achieve the above objects, the present invention comprises a request receiving unit for receiving a request from a client connected via a network to acquire an object reference for receiving a distribution of a naming service in CORBA, and a generating unit for generating the object reference by dynamically setting address information contained in the object reference in accordance with connection information at the time of the request.

According to the present invention, address information is dynamically set and an object reference is generated in accordance with connection information at the time of a request from a client, therefore, in comparison with the address information being fixed once it has been set, as is the case conventionally, it is possible to provide a naming service in CORBA to a client with a high degree of reliability regardless of the operating format or network format.

Other objects and features of this invention will become understood from the following description with reference to the accompanying drawings.

BRIEF DESCRIPTION OF THE DRAWINGS

FIG. 2 is a block diagram showing the structure of the business server 100 shown in FIG. 1.

FIG. 3 is a block diagram showing the structure of the business server 200 shown in FIG. 1.

FIG. 5 is a block diagram showing the structure of the second embodiment of the present invention.

FIG. 6 is a block diagram showing the structure of the business server 300 shown in FIG. 5.

FIG. 9 is a block diagram showing the structure of the active business server 400 shown in FIG. 8.

FIG. 10 is a block diagram showing the structure of the standby business server 500 shown in FIG. 8.

DESCRIPTION OF THE PREFERRED EMBODIMENTS

The first to third embodiments of the object reference generating device, the object reference generating method, and the computer readable recording medium on which an object reference generating program is recorded, each according to the present invention, will now be described in detail with reference made to the drawings.

Figure 1:
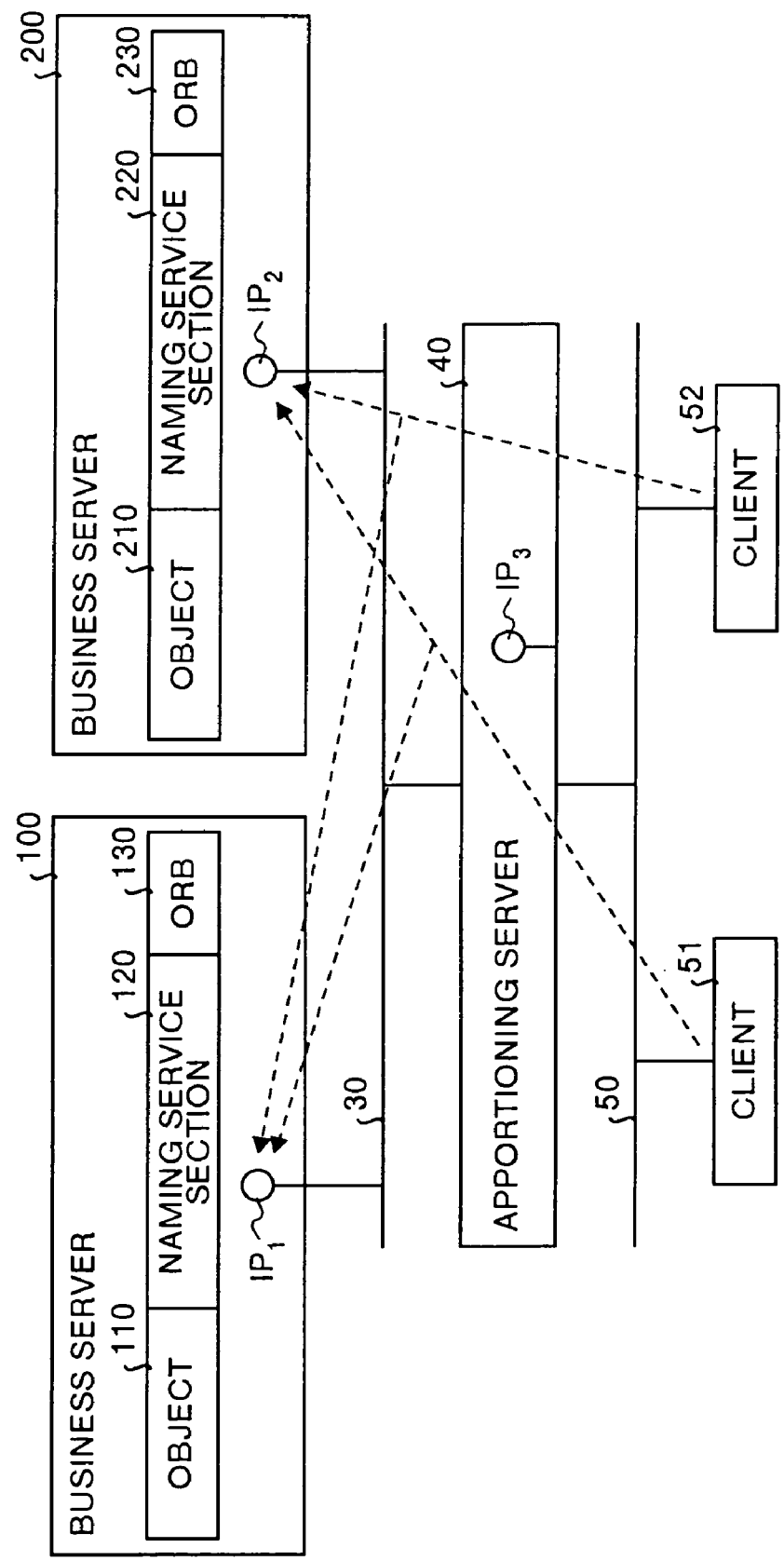
FIG. 1 is a block diagram showing the structure of the first embodiment of the present invention.
Figure 12:
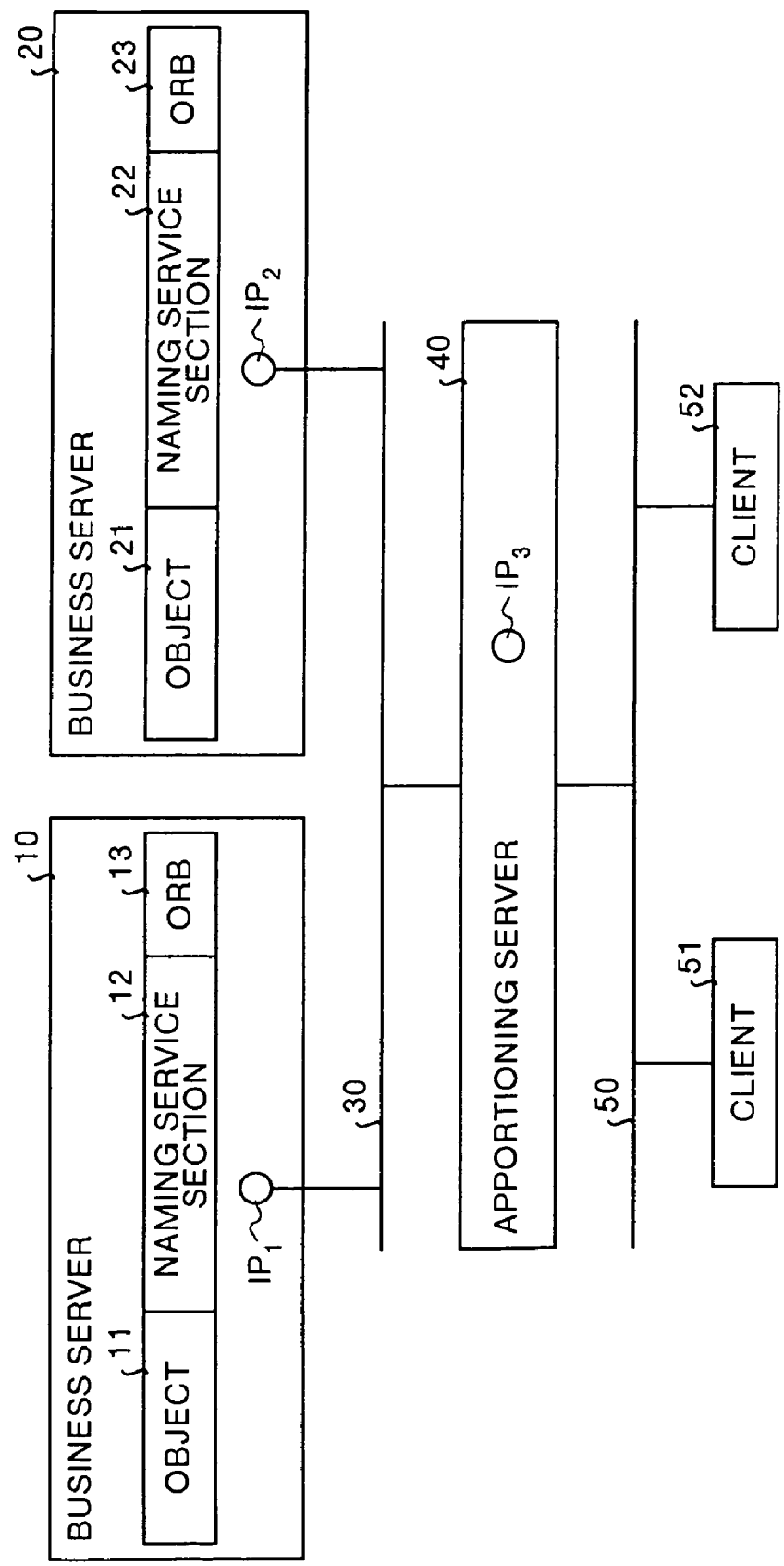
FIG. 12 is a block diagram showing a first structural example of a conventional object reference generating system.

FIG. 1 is a block diagram showing the structure of the first embodiment of the present invention. In this diagram those portions corresponding to portions shown in FIG. 12 are given the same descriptive symbols and a description thereof is omitted. In FIG. 1, instead of the business server 10 and the business server 20 shown in FIG. 12, there are provided a business server 100 and a business server 200. The business server 100 and business server 200 are separately provided so as to distribute the load in response to accesses from a client 51 and a client 52 and provide the same service to the client 51 and the client 52.

The business server 100 is connected to a network 30 and provides the object 110 (for example, an application program) to the clients 51 and 52. The IP address $IP_1$ is allocated to the business server 100. A naming service section 120 provides a naming service to the clients 51 and 52 using an object reference, in the same way as the naming service 12 (see FIG. 12).

However, the object reference generating method of the naming service section 120 is different to the generating method of the naming service 12 as is described below. The ORB 130 is a software bus for acting as an intermediary between the business server 100 and the clients 51 and 52. The ORB 130 has an initial object reference that includes its own IP address and PORT number.

FIG. 2 is a block diagram showing the structure of the business server 100 shown in FIG. 1. In this diagram those portions corresponding to portions shown in FIG. 1 are given the same descriptive symbols. The ORB 130 shown in FIG. 2 is formed from a connection control section 131, an interface apportioning section 132, an ORB interface processing section 133, and a system structure information control section 134. The connection control section 131 controls the connections with the client 51 and the client 52.

Figure 13:
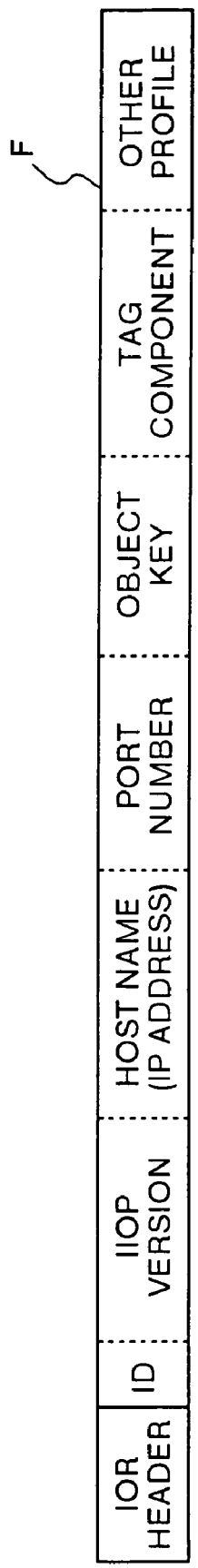
FIG. 13 is a diagram showing a format F of an object reference.

The interface apportioning section 132 is provided with the function of apportioning the interface within the ORB 130. The ORB interface processing section 133 performs the interface processing between the interface apportioning section 132 and the naming service section 120, and between the system structure information control section 134 and the naming service section 120. In the naming service section 120, an object reference $OR_1$ having the format F shown in FIG. 13 is generated.

The system structure information control section 134 controls the system structure information $J_1$. This system structure information $J_1$ is information showing the structure of the object reference generating system (in this case, the load distribution structure) shown in FIG. 1. This system structure information $J_1$ is also information showing the corresponding relationship between the IP address for load distribution and the IP address subject to load distribution in the business server 100.

The IP address subject to load distribution is an IP address showing the subject of the load distribution, in other words, showing the destination of the load distribution, and, in this case, is the IP address $IP_1$ (see FIG. 1) allocated to the business server 100. The IP address for load distribution is an IP address for also applying a naming service to load distribution using the apportioning server 40, and, in this case, is the IP address $IP_3$ (see FIG. 1) allocated to the apportioning server 40. The structure information registering tool T registers the system structure information $J_1$ in the system structure information control section 134 by the operation of the system controller.

The business server 200 performs load distribution in cooperation with the business server 100 and is connected to the network 30. The structure of the business server 200 is the same as that of the business server 100. Namely, the object 210, the naming service section 220, and the ORB 230 in the business server 200 are respectively provided with the same functions as the object 110, the naming service section 120, and the ORB 130 in the business server 100. The IP address $IP_2$ is allocated to the business server 200.

FIG. 3 is a block diagram showing the structure of the business server shown 200 in FIG. 1. In this figure, the same descriptive symbols are given to those portions that correspond to portions in FIG. 1. The ORB 230 shown in FIG. 3 is formed from a connection control interface 231, an interface apportioning section 232, an ORB interface processing section 233, and a system structure information control section 234. The connection control section 231 controls connections with the client 51 and the client 52.

The interface apportioning section 232 has the function of apportioning the interface in the ORB 230. The ORB interface processing section 233 performs interface processing between the interface apportioning section 232 and the naming service section 220 and between the system structure information control section 234 and the naming service section 220. An object reference $OR_2$ having the format F shown in FIG. 13 is generated in the naming service section 220.

The system structure information control section 234 controls the system structure information $J_2$. This system structure information $J_2$ is information showing the structure of the object reference generating system (in this case, the load distributed structure) shown in FIG. 1. The system structure information $J_2$ also shows the corresponding relationship between the IP address for load distribution and the IP address subject to load distribution in the business server 200.

The IP address subject to the load distribution is an IP address showing the subject of the load distribution, in other words, showing the destination of the load distribution, and, in this case, is the IP address $IP_2$ (see FIG. 1) allocated to the business server 200. The IP address for load distribution is an IP address for applying a naming service to load distribution using the apportioning server 40, and, in this case, is the IP address $IP_3$ (see FIG. 1) allocated to the apportioning server 40. The structure information registering tool T registers the system structure information $J_2$ in the system structure information control section 234 by the operation of the system controller.

Next, the operation of the first embodiment will be described with reference made to the flow charts shown in FIGS. 4A and 4B. When an object reference acquisition request for acquiring an object reference of the naming service is sent from the client 51 shown in FIG. 1, then, in step SB1 shown in FIG. 4B, the apportioning server 40 determines whether or not the arrival IP address is an apportioning IP address (in this case, the IP address $IP_3$). If, in this case, the arrival IP address is taken as the IP address $IP_1$, then the result of the determination is negative. In step SB4, the apportioning server 40 establishes a connection with the IP address $IP_1$ of the business server 100 and transmits the data from the client 51 to the relevant IP address $IP_1$.

As a result, a connection is established (SYN) between the connection control section 131 and the client 51 shown in FIG. 2. The fact that the arrival IP address=IP address $IP_1$ and that the arrival PORT=$P_x$ is included in the connection information in this case. Next, the object reference acquisition request (REQUEST) from the client 51 and the connection information are transferred to the naming service section 120 via the interface apportioning section 132 and the ORB interface processing section 133.

Figure 4A:
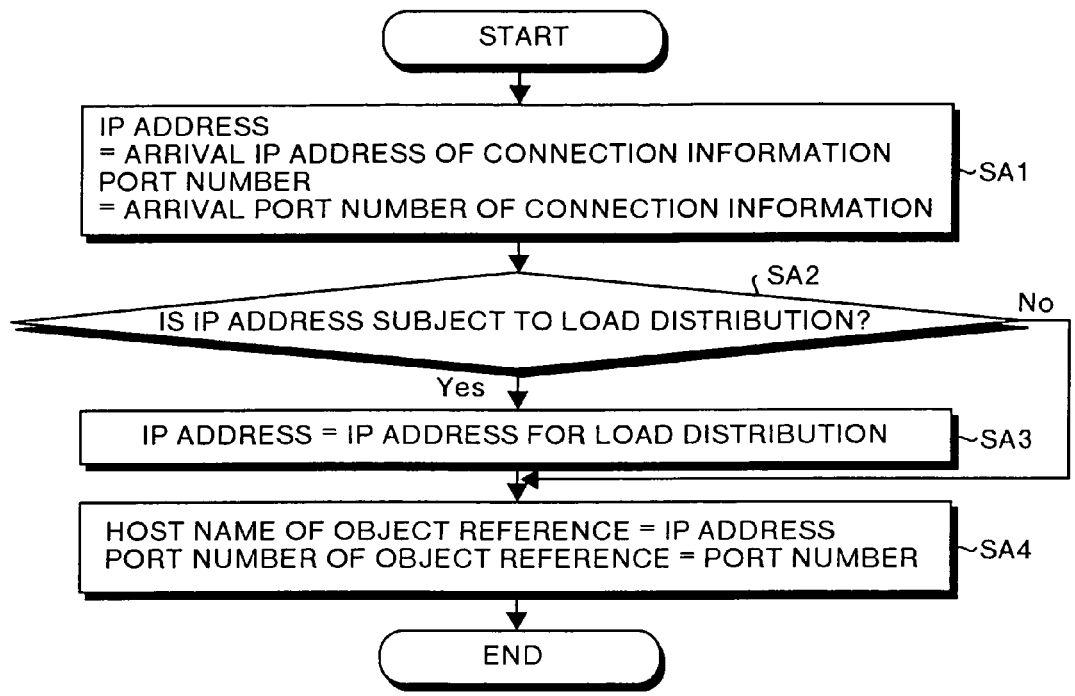
FIGS. 4A and 4B are flow chart describing the operation of the first embodiment.

As a result, in step SA1 shown in FIG. 4A, the naming service section 120 recognizes the IP address $IP_1$ (arrival IP address) of the connection information as the IP address and recognizes the arrival PORT=$P_x$ of the connection information as the PORT number. In step SA2, the naming service section 120 refers to the system structure information $J_1$ and determines whether or not the recognized IP address (i.e. the IP address $IP_1$ in this case) is an IP address subject to load distribution. In this case, the result of the determination will be taken as affirmative.

In step SA3, the naming service section 120 refers to the system structure information $J_1$ and sets the IP address as an IP address for load distribution (in this case, the IP address $IP_3$). In step SA4, the naming service section 120 sets the host name of the object reference $OR_1$ (see FIG. 13) as the IP address for load distribution (in this case, the IP address $IP_3$). It then sets the PORT number of the object reference $OR_1$ as PORT and generates the object reference $OR_1$.

As a result, after the object reference $OR_1$ shown in FIG. 2 has been transferred as REPLY to the connection control section 131 via the ORB interface processing section 133 and the interface apportioning section 132, it is transferred as DATA to the client 51 via the network 30, the apportioning server 40, and the network 50 shown in FIG. 1.

Thereafter, based on the object reference $OR_1$ that includes at least the IP address $IP_3$, the client 51 sends an access request to the object 110 (or the object 210). Namely, if this access request is sent to the IP address $IP_3$, the apportioning server 40 distributes the load to that server out of the business server 100 and the business server 200 that has the lightest load. As a result, the client 51 is provided with the object 110 or the object 210 that was the destination of the load distribution.

If, however, the result of the determination in step SA2 shown in FIG. 4A is negative, then, in step SA4, the naming service section 120 sets the host name of the object reference $OR_1$ (see FIG. 13) as an IP address other than an IP address for load distribution. It also sets the PORT number of the object reference $OR_1$ as PORT and generates the object reference $OR_1$.

Figure 4B:
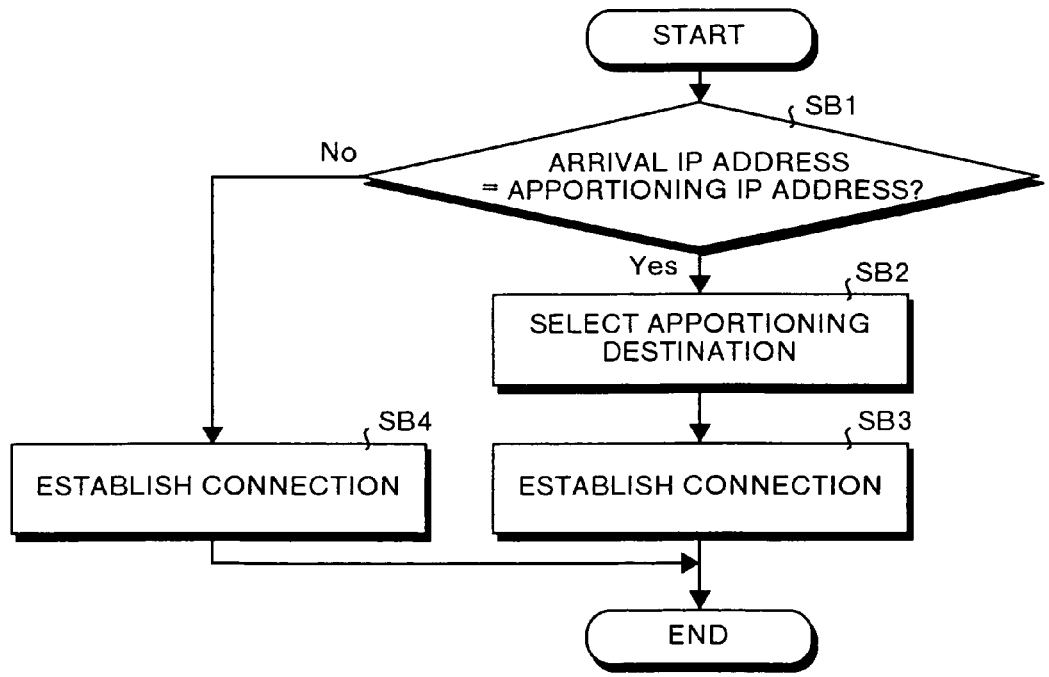

Moreover, When an object reference acquisition request for acquiring an object reference of the naming service is sent from the client 51 shown in FIG. 1, then, in step SB1 shown in FIG. 4B, a determination is made as to whether or not the arrival IP address of the apportioning server 40 is an apportioning IP address (in this case, the IP address $IP_3$). If, in this case, the arrival IP address is taken as the IP address $IP_2$, then the result of the determination is negative. In step SB4, the apportioning server 40 establishes a connection with the IP address $IP_2$ of the business server 200 and transmits the data from the client 51 to the relevant IP address $IP_2$.

As a result, a connection is established (SYN) between the connection control section 231 and the client 51 shown in FIG. 3. The fact that the arrival IP address=IP address $IP_2$ and that the arrival PORT=$P_x$ is included in the connection information in this case. Next, the object reference acquisition request (REQUEST) from the client 51 and the connection information are transferred to the naming service section 220 via the interface apportioning section 232 and the ORB interface processing section 233.

As a result, in step SA1 shown in FIG. 4A, the naming service section 220 recognizes the IP address $IP_2$ (arrival IP address) of the connection information as the IP address and recognizes the arrival PORT=$P_x$ of the connection information as the PORT number. In step SA2, the naming service section 220 refers to the system structure information $J_2$ and determines whether or not the recognized IP address (i.e. the IP address $IP_2$ in this case) is an IP address subject to load distribution. In this case, the result of the determination will be taken as affirmative.

In step SA3, the naming service section 220 refers to the system structure information $J_2$ and sets the IP address as an IP address for load distribution (in this case, the IP address $IP_3$). In step SA4, the naming service section 220 sets the host name of the object reference $OR_2$ (see FIG. 13) as the IP address for load distribution (in this case, the IP address $IP_3$). It then sets the PORT number of the object reference $OR_2$ as PORT and generates the object reference $OR_2$.

As a result, after the object reference $OR_2$ shown in FIG. 3 has been transferred as REPLY to the connection control section 231 via the ORB interface processing section 233 and the interface apportioning section 232, it is transferred as DATA to the client 51 via the network 30, the apportioning server 40, and the network 50 shown in FIG. 1.

Thereafter, based on the object reference $OR_2$ that includes at least the IP address $IP_3$, the client 51 sends an access request to the object 110 (or the object 210). Namely, if this access request is sent to the IP address $IP_3$, the apportioning server 40 distributes the load to that server out of the business server 100 and the business server 200 that has the lightest load. As a result, the client 51 is provided with the object 110 or the object 210 that was the destination of the load distribution.

As described above, according to the first embodiment, because the object reference $OR_1$ was generated by dynamically setting an IP address conforming to the load distribution system structure based on the system structure information $J_1$, it is possible to provide a naming service in CORBA with a high degree of reliability to a client even in a load distribution system.

Figure 14:
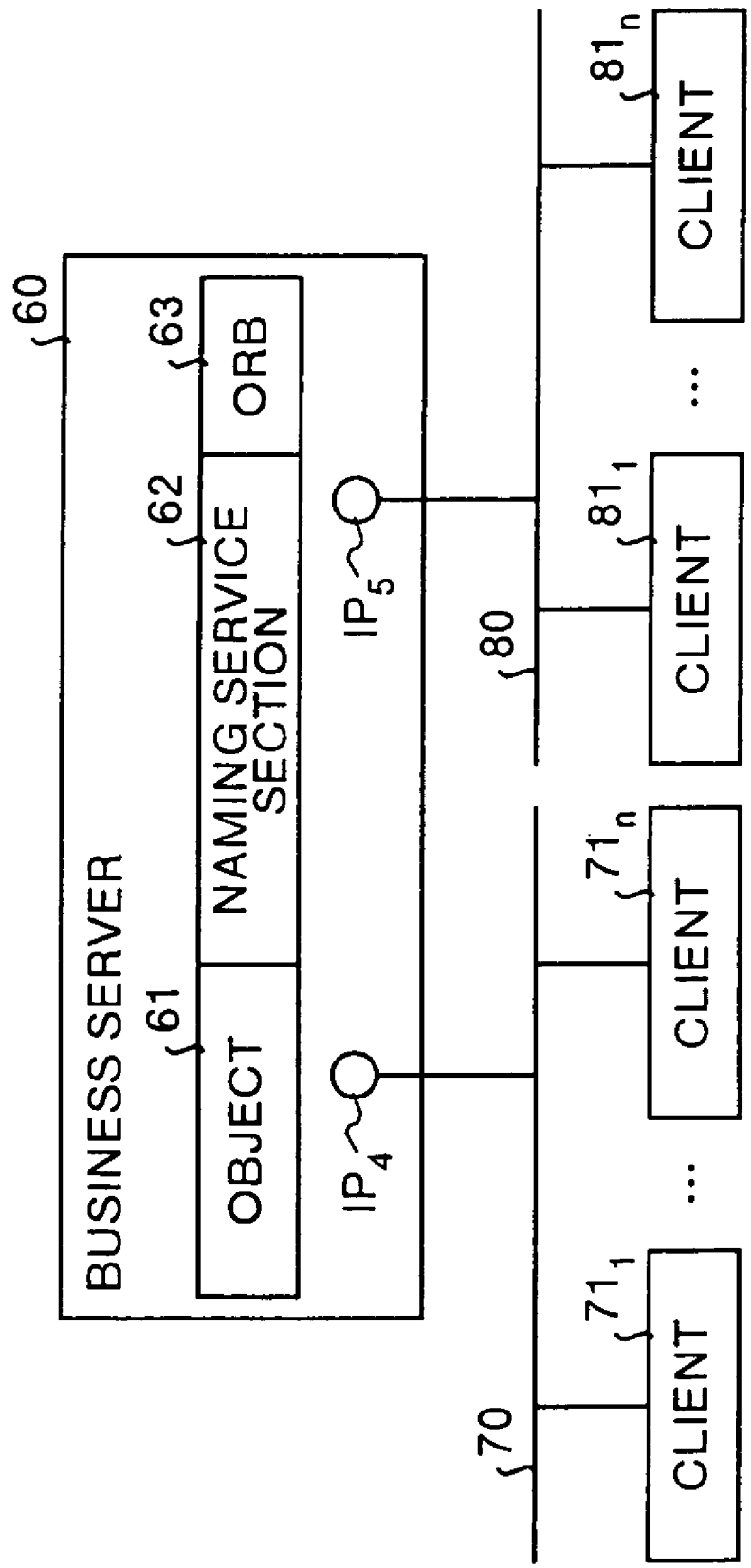
FIG. 14 is a block diagram showing a second structural example of a conventional object reference generating system.

FIG. 5 is a block diagram showing the structure of the second embodiment of the present invention. In this diagram, those portions that correspond to portions in FIG. 14 are given the same descriptive symbols and a description thereof is omitted. In this diagram, a business server 300 is provided instead of the business server 60 shown in FIG. 14.

FIG. 5 shows an object reference generating system provided with: a single business server 300; a first group network 70 and a second group network 80 that are independent of each other; clients $71_1$ to $71_n$ who are connected to the first group network 70 and form a first group; and clients $81_1$ to $81_n$ who are connected to the second group network 80 and form a second group.

In this diagram, the business server 300 provides service to the clients $71_1$ to $71_n$ and the clients $81_1$ to $81_n$ and is connected to both the first group network 70 and the second group network 80. The IP address $IP_4$ and the IP address $IP_5$ are both allocated to the business server 300. The IP address $IP_4$ corresponds to the first group network 70 and the IP address $IP_5$ corresponds to the second group network 80. The business server 300 is formed from an object 310, a naming service section 320, and an ORB 330.

FIG. 6 is a block diagram showing the structure of the business server 300 shown in FIG. 5. In this diagram, those portions that correspond to portions in FIG. 5 have been given the same descriptive symbols and a description thereof has been omitted. The ORB 330 shown in FIG. 6 is formed from a connection control section 331, an interface apportioning section 332, an ORB interface processing section 333, and a system structure information control section 334. The connection control section 331 controls the connections between the clients $71_1$ to $71_n$ and the clients $81_1$ to $81_n$.

The interface apportioning section 332 is provided with the function of apportioning the interface within the ORB 330. The ORB interface processing section 333 performs the interface processing between the interface apportioning section 332 and the naming service section 320, and between the system structure information control section 334 and the naming service section 320. In the naming service section 320, an object reference $OR_3$ having the format F shown in FIG. 13 is generated.

The system structure information control section 334 controls system structure information $J_3$ the same as the system structure information $J_1$ and the like. However, in the second embodiment, the system structure information $J_3$ is not registered in the system structure information control section 334. This system structure information $J_3$ is registered when the business server 300 is functioning as a server for load distribution or as a server for hot standby (described below).

Next, the operation of the second embodiment will be described with reference made to the flow chart shown in FIG. 7. When an object reference acquisition request for acquiring an object reference of the naming service is sent from the client $71_1$ shown in FIG. 5 to the IP address $IP_4$ shown in FIG. 5, a connection is established (SYN) between the connection control section 331 and the client $71_1$ shown in FIG. 6. The fact that the arrival IP address=IP address $IP_4$ and that the arrival PORT=$P_x$ is included in the connection information in this case. Next, the object reference acquisition request (REQUEST) from the client $71_1$ and the connection information are transferred to the naming service section 320 via the interface apportioning section 332 and the ORB interface processing section 333.

Figure 7:
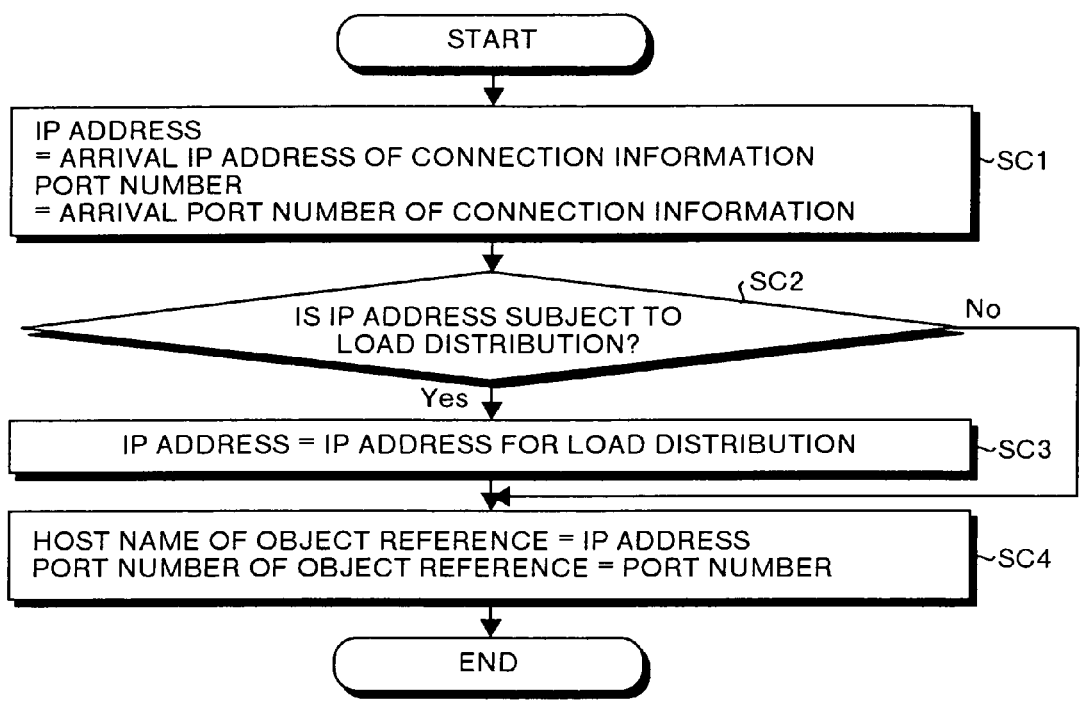
FIG. 7 is a flow chart describing the operation of the second embodiment.

As a result, in step SC1 shown in FIG. 7, the naming service section 320 recognizes the IP address $IP_4$ (arrival IP address) of the connection information as the IP address and recognizes the arrival PORT=$P_x$ of the connection information as the PORT number. In step SC2, the naming service section 320 determines whether or not the recognized IP address (i.e. the IP address $IP_4$ in this case) is an IP address subject to load distribution. In this case, the result of the determination will be taken as negative.

In step SC4, the naming service section 320 sets the host name of the object reference $OR_3$ (see FIG. 13) as the IP address $IP_4$ (the arrival IP address) of the connection information. It then sets the PORT number as connection information arrival PORT=$P_x$ and generates the object reference $OR_3$.

After the object reference $OR_3$ has been transferred as REPLY to the connection control section 331 via the ORB interface processing section 333 and the interface apportioning section 332, it is transferred as DATA to the client $71_1$ via the first group network 70 shown in FIG. 5. Thereafter, based on the object reference $OR_3$ that includes at least the IP address $IP_4$, the client 71' sends an access request to the object 310. Namely, if this access request is sent to the IP address $IP_4$, the client $71_1$ is provided with the object 310.

If, however, the result of the determination in step SC2 shown in FIG. 7 is affirmative, then when the business server 300 is functioning as a server for load distribution, in step SC3, the naming service section 320 refers to the system structure information $J_3$ in the same way as in step SA3 (see FIG. 4A) and sets the IP address as an IP address for load distribution. In step SC4, the naming service section 320 sets the host name of the object reference $OR_3$ as an IP address for load distribution, sets the PORT number of the object reference $OR_3$ as PORT, and generates the object reference $OR_3$.

Note that, the naming service section 320 also generates an object reference $OR_3$ that includes the IP address $IP_5$ through the above described operation when an object reference acquisition request to the naming service is sent from the client $81_1$ shown in FIG. 5. When this object reference $OR_3$ is transferred to the client $81_1$, the client $81_1$ sends an access request to the object 310 based on the object reference $OR_3$ that includes at least the IP address $IP_5$. Namely, if this access request is sent to the IP address $IP_5$, the client $81_1$ is provided with the object 310.

As described above, according to the second embodiment, because the object reference $OR_3$ was generated by setting at least arrival IP address information contained in connection information as an IP address, it is possible to provide a naming service in CORBA with a high degree of reliability to a client even when the request destinations are a plurality of IP addresses corresponding to a plurality of first group networks 70 and second group networks 80 that are independent of each other.

Figure 8:
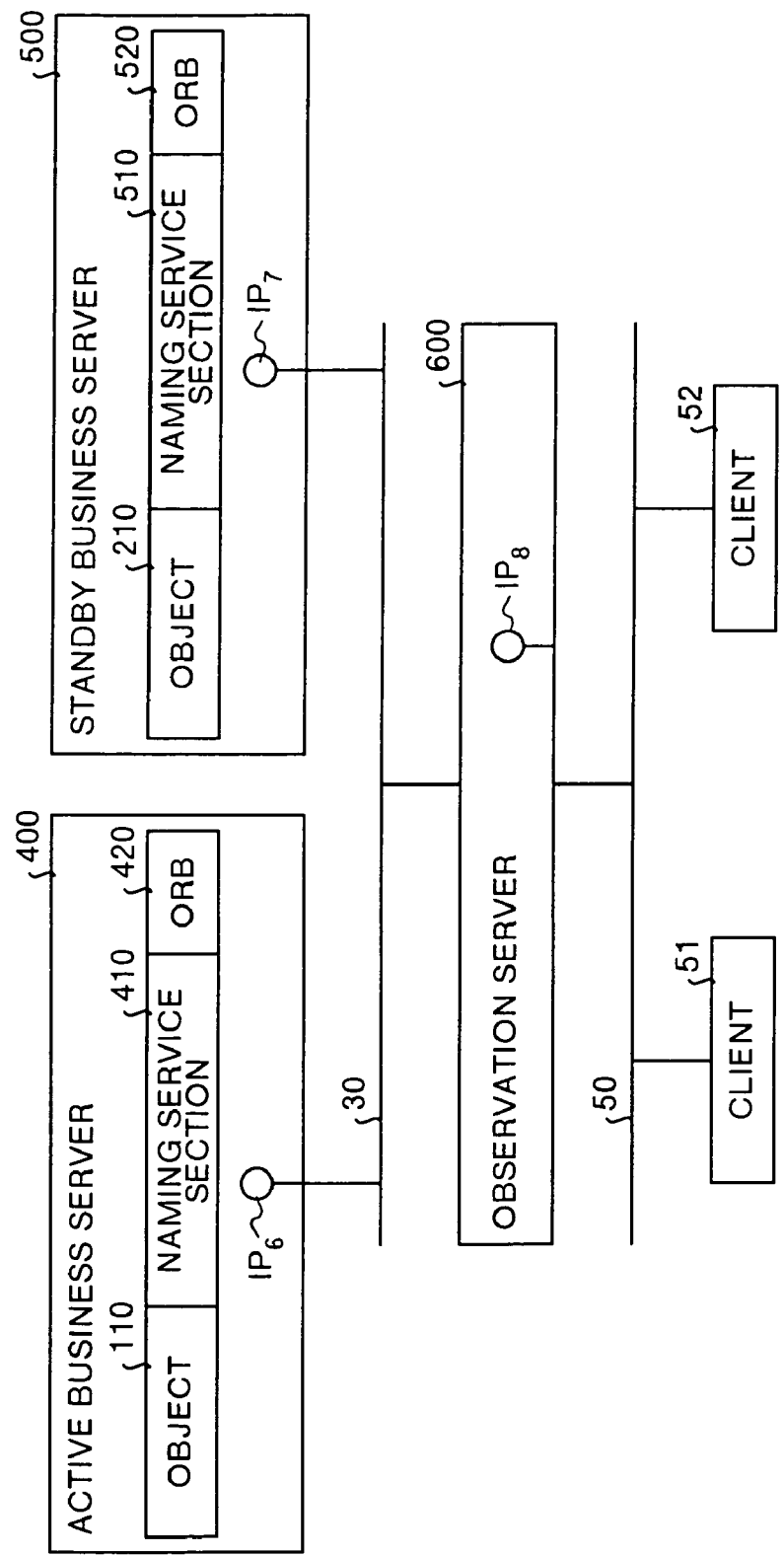
FIG. 8 is a block diagram showing the structure of the third embodiment of the present invention.

FIG. 8 is a block diagram showing the structure of the third embodiment of the present invention. In this diagram, those portions that correspond to portions in FIG. 1 are given the same descriptive symbols and a description thereof is omitted. In FIG. 8, an active business server 400, a standby business server 500, and an observation server 600 are provided instead of the business server 100, the business server 200, and the apportioning server 40 shown in FIG. 1.

The active business server 400 and the standby business server 500 employ a hot standby structure. Namely, the active business server 400 normally provides service as an active system to the client 51 and the client 52, while the standby business server 500 provides service to the client 51 and 52 instead of the active business server 400 when an abnormality occurs in the active business server 400.

The observation server 600 observes the operational states of the active business server 400 and the standby business server 500 and has the function of apportioning accesses from the client 51 or the client 52 to the server currently being operated as active. The observation server 600 is given the IP address $IP_8$.

The active business server 400 is connected to the network 30 and supplies an object 110 (for example, an application program) to the clients 51 and 52. The IP address $IP_6$ is given to the active business server 400. In the same way as the naming service section 12 (see FIG. 1), the naming service section 410 provides a naming service to the clients 51 and 52 by object reference.

The object reference generating method of the naming service section 410 is different to the generation method of the naming service section 12, as is described later. The ORB 420 is a software bus for acting as an intermediary between the active business server 400 and the clients 51 and 52. The ORB 420 has an initial object reference that includes its own IP address and PORT number.

FIG. 9 is a block diagram showing the structure of the business server 400 shown in FIG. 8. In this diagram those portions corresponding to portions shown in FIG. 8 are given the same descriptive symbols. The ORB 420 shown in FIG. 9 is formed from a connection control section 421, an interface apportioning section 422, an ORB interface processing section 423, and a system structure information control section 424. The connection control section 421 controls the connections with the client 51 and the client 52.

The interface apportioning section 422 is provided with the function of apportioning the interface within the ORB 420. The ORB interface processing section 423 performs the interface processing between the interface apportioning section 422 and the naming service section 410, and between the system structure information control section 424 and the naming service section 410. In the naming service section 410, an object reference $OR_4$ having the format F shown in FIG. 13 is generated.

The system structure information control section 424 controls the system structure information $J_4$. This system structure information $J_4$ is information showing the structure of the object reference generating system (in this case, the hot standby structure) shown in FIG. 8. This system structure information $J_4$ is also information showing the corresponding relationship between the IP address for hot standby and the IP address subject to hot standby in the business server 400.

The IP address subject to hot standby is an IP address specifying the subject of the hot standby, and, in this case, is the IP address $IP_6$ (see FIG. 8) allocated to the active business server 400. The IP address for hot standby is an IP address for applying a naming service to a hot standby structure using the observation server 600, and, in this case, is the IP address $IP_8$ (see FIG. 8) allocated to the observation server 600. The structure information registering tool T registers the system structure information $J_4$ in the system structure information control section 424 by the operation of the system controller.

The standby business server 500 shown in FIG. 8 completes the hot standby structure in cooperation with the active business server 400 and is connected to the network 30. The structure of the standby business server 500 is the same as that of the active business server 400. Namely, the object 210, the naming service section 510, and the ORB 520 in the standby business server 500 are respectively provided with the same functions as the object 110, the naming service section 410, and the ORB 420 in the active business server 400. The IP address $IP_7$ is allocated to the standby business server 500.

FIG. 10 is a block diagram showing the structure of the standby business server 500 shown in FIG. 8. In this figure, the same descriptive symbols are given to those portions that correspond to portions in FIG. 8. The ORB 520 shown in FIG. 10 is formed from a connection control interface 521, an interface apportioning section 522, an ORB interface processing section 523, and a system structure information control section 524. The connection control section 521 controls connections with the client 51 and the client 52.

The interface apportioning section 522 has the function of apportioning the interface in the ORB 520. The ORB interface processing section 523 performs interface processing between the interface apportioning section 522 and the naming service section 510 and between the system structure information control section 524 and the naming service section 510. An object reference $OR_5$ having the format F shown in FIG. 13 is generated in the naming service section 510.

The system structure information control section 524 controls the system structure information $J_5$. This system structure information $J_5$ is information showing the structure of the object reference generating system (in this case, the hot standby structure) shown in FIG. 8. The system structure information $J_5$ also shows the corresponding relationship between the IP address for hot standby and the IP address subject to hot standby in the standby business server 500.

The IP address subject to hot standby is an IP address showing the subject of the hot standby, and, in this case, is the IP address $IP_7$ (see FIG. 8) allocated to the standby business server 500. The IP address for hot standby is an IP address for applying a naming service to a hot standby structure using the observation server 600, and, in this case, is the IP address $IP_8$ (see FIG. 8) allocated to the observation server 600. The structure information registering tool T registers the system structure information $J_5$ in the system structure information control section 524 by the operation of the system controller.

Next, the operation of the third embodiment will be described with reference made to the flow charts shown in FIGS. 11A and 11B. When an object reference acquisition request for acquiring an object reference of the naming service is sent from the client 51 shown in FIG. 8, then, in step SE1 shown in FIG. 11B, the observation server 600 determines whether or not the arrival IP address is an apportioning IP address (in this case, the IP address $IP_8$). If, in this case, the arrival IP address is taken as the IP address $IP_6$, then the observation server 600 takes the result of the determination in step SE1 as negative. In step SE4, the observation server 600 establishes a connection with the IP address $IP_6$ of the active business server 400 and transmits data from the client 51 to the relevant IP address $IP_6$.

As a result, a connection is established (SYN) between the connection control section 421 and the client 51 shown in FIG. 9. The fact that the arrival IP address=IP address $IP_6$ and that the arrival PORT=$P_x$ is included in the connection information in this case. Next, the object reference acquisition request (REQUEST) from the client 51 and the connection information are transferred to the naming service section 410 via the interface apportioning section 422 and the ORB interface processing section 423.

Figure 11A:
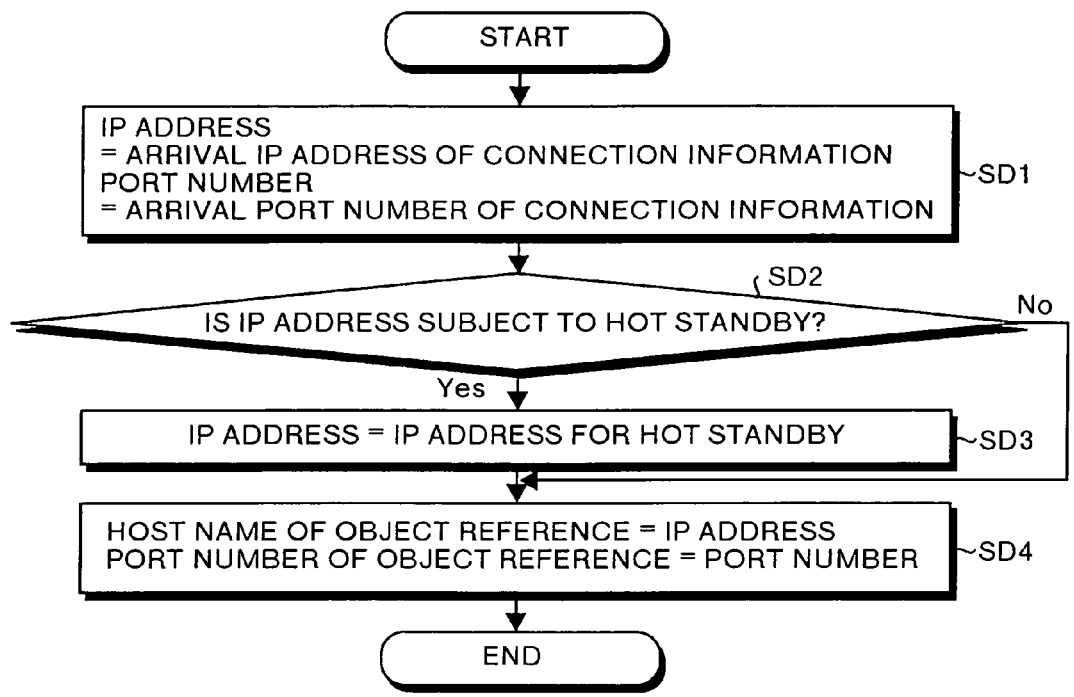
FIG. 11 is a flow chart describing the operation of the third embodiment.
Figure 11B:
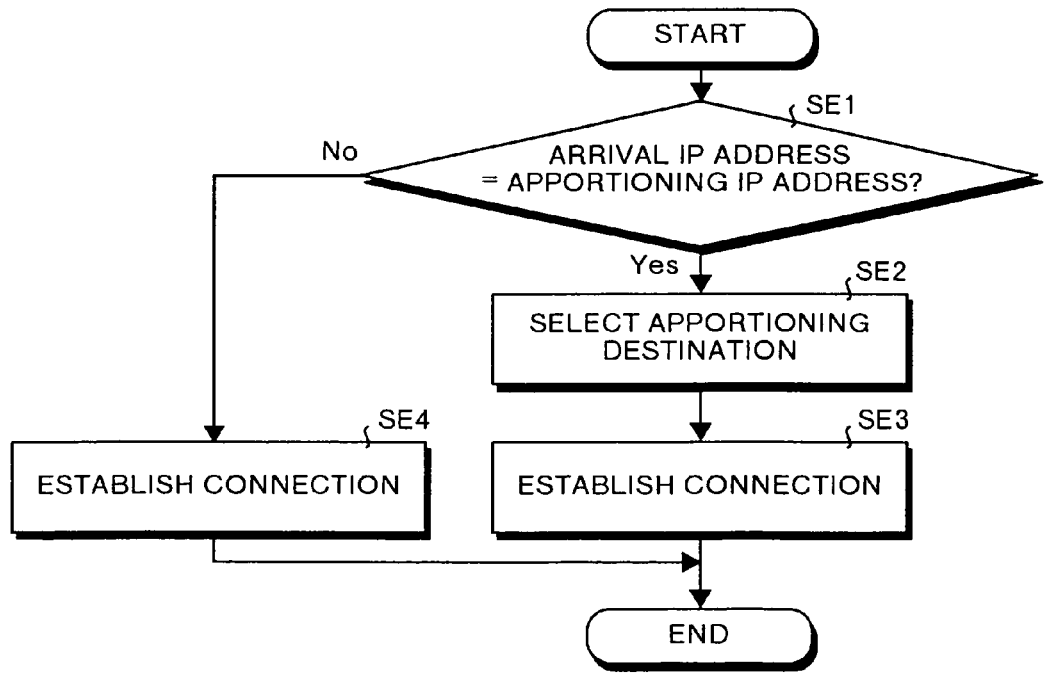

As a result, in step SD1 shown in FIG. 11A, the naming service section 410 recognizes the IP address $IP_6$ (arrival IP address) of the connection information as the IP address and recognizes the arrival PORT=P of the connection information as the PORT number. In step SD2, the naming service section 410 refers to the system structure information $J_4$ and determines whether or not the recognized IP address (i.e. the IP address $IP_6$ in this case) is an IP address subject to hot standby.

In this case, the result of the determination will be taken as affirmative.

In step SD3, the naming service section 410 refers to the system structure information $J_4$ and sets the IP address as an IP address for hot standby (in this case, the IP address $IP_8$). In step SD4, the naming service section 410 sets the host name of the object reference $OR_4$ (see FIG. 13) as the IP address for hot standby (in this case, the IP address $IP_8$). It then sets the PORT number of the object reference $OR_4$ as PORT and generates the object reference $OR_4$.

As a result, after the object reference $OR_4$ shown in FIG. 9 has been transferred as REPLY to the connection control section 421 via the ORB interface processing section 423 and the interface apportioning section 422, it is transferred as DATA to the client 51 via the network 30, the observation server 600, and the network 50 shown in FIG. 8.

Thereafter, based on the object reference $OR_4$ that includes at least the IP address $IP_8$, the client 51 sends an access request to the object 110 (or the object 210). Namely, if this access request is sent to the IP address $IP_8$, then, in step SE1 shown in FIG. 11B, the observation server 600 takes the result of the determination as affirmative. In step SE2, the observation server 600 apportions the access request to the active business server 400 out of the active business server 400 and the standby business server 500 that are in operation. In step SE3, the observation server 600 establishes a connection between the client 51 and the active business server 400.

As a result, the client 51 is provided with the object 110 in the active business server 400. Note that, when the operation of the active business server 400 is halted, the observation server 600 apportions the access request to the standby business server 500. In this case, the client 51 is provided with the object 210 in the standby business server 500.

As described above, according to the third embodiment, because the object reference $OR_4$ was generated by dynamically setting an IP address conforming to the hot standby structure based on the system structure information $J_4$, it is possible to provide a naming service in CORBA with a high degree of reliability to a client even in a hot standby system.

In this way, according to the first to third embodiments, because, for example, an IP address is dynamically set and an object reference generated in accordance with connection information at the time a request is made by a client, in comparison with the IP address being fixed once it has been set, as is the case conventionally, it is possible to provide a naming service in CORBA to a client with a high degree of reliability regardless of the operating format or network format.

The first to third embodiments of the present invention have been described above in detail with reference made to the drawings, however, specific structural examples are not limited to these first to third embodiments. Namely, any alterations in design that do not deviate from the substance of the present invention are included in the present invention. For example, in the aforementioned first to third embodiments, it is also possible to record an object reference generating program for fulfilling the function of generating an object reference on a computer readable recording medium; reading on a computer (omitted from the drawings) the object reference generating program recorded on the recording medium; and generating the object reference by running this program.

This computer is formed from a CPU for running the object reference generating program, an input device such as a keyboard and a mouse, ROM (Read Only Memory) for storing various types of data, RAM (Random. Access Memory) for storing calculation parameters and the like, a reading device for reading the object reference generating program from the recording medium, output devices such as a display, printer, or the like, and a bus for connecting the various devices.

After the CPU has read via the reading device the object reference generating program recorded on the recording medium, the CPU generates an object reference by running the object reference generating program. Note that, portable recording media such as optical disks, floppy disks, and hard disks may naturally be used as the recording medium, while transmission media that temporarily record and hold data, such as a network, may also be used as the recording medium.

As has been described above, according to the present invention, the effect is obtained that, because address information is dynamically set and an object reference generated in accordance with connection information at the time a request is made by a client, in comparison with the IP address being fixed once it has been set, as is the case conventionally, it is possible to provide a naming service in CORBA to a client with a high degree of reliability regardless of the operating format or network format.

Moreover, according to the present invention, the effect is obtained that, because an object reference is generated by setting at least arrival address information contained in connection information as address information, it is possible to provide a naming service in CORBA with a high degree of reliability to a client even when the request destinations are a plurality of groups of address information corresponding to a plurality of networks that are independent of each other.

Moreover, according to the present invention, the effect is obtained that, because an object reference is generated by dynamically setting address information conforming to the system structure based on system structure information, it is possible to provide a naming service in CORBA with a high degree of reliability to a client even in a load distribution system, hot standby system, and the like.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A CORBA object reference generating device stored on a computer recordable medium, comprising:
   a request receiving unit which receives, via a server having a server IP address, a request for Common Object Request Broker Architecture (CORBA) naming service, the request being transmitted by a first client to an arrival IP address; and
   a naming service unit which generates a CORBA object reference including a reference IP address, the CORBA object reference being required for the first client to access an object;
   wherein the naming service unit
   receives the request and connection information including the arrival IP address,
   determines whether the arrival IP address is a predetermined IP address,
   sets the server IP address as the reference IP address if the arrival IP address is determined to be the predetermined IP address, and
   sets an IP address other than the server IP address as the reference IP address if the arrival IP address is not determined to be the predetermined IP address.

2. The CORBA object reference generating device stored on a computer recordable medium according to claim 1, further comprising:

a system structure information control unit that controls system structure information that indicates a relationship between the predetermined IP address and the server IP address, wherein the naming service unit refers to the system structure information to make the determination and generate the CORBA object reference.

3. A CORBA object reference generating device stored on a computer recordable medium, comprising:

a request receiving unit that receives, from a first client connected to a first network, a first request for CORBA naming service, the first request being transmitted from the first client to a first IP address corresponding to the first network, and from a second client connected to a second network, a second request for CORBA naming service, the second request being transmitted from the second client to a second IP address corresponding to the second network; and a naming service unit that generates an object reference including a reference IP address, the object reference being required for the first or second client to access an object, wherein the naming service unit receives connection information including the first or second IP address and the first or second request for CORBA naming service, determines whether the first or second IP address is a predetermined IP address, sets an IP address for load distribution as the reference IP address if it is determined that the first or second IP address is determined to be the predetermined IP address, and sets the first or second IP address as the reference IP address if it is determined that the first or second IP address is not determined to be the predetermined IP address.

4. A CORBA object reference generating method comprising:

receiving, via a server having a server IP address, a request for Common Object Request Broker Architecture (CORBA) naming service, the request being transmitted by a first client to an arrival IP address; and generating a CORBA object reference including a reference IP address, the CORBA object reference being required for the first client to access an object;

wherein the generating includes receiving the request and connection information including the arrival IP address, determining whether the arrival IP address is a predetermined IP address, setting the server IP address as the reference IP address if the arrival IP address is determined to be the predetermined IP address, and setting an IP address other than the server IP address as the reference IP address if the arrival IP address is not determined to be the predetermined IP address.

5. The CORBA object reference generating method according to claim 4, further comprising:

controlling system structure information that indicates a relationship between the predetermined IP address and the server IP address, wherein the generating further includes referring to the system structure information to make the determination and generate the CORBA object reference.

6. A CORBA object reference generating method, comprising:

receiving, from a first client connected to a first network, a first request for CORBA naming service, the first request being transmitted from the first client to a first IP address corresponding to the first network, and from a second client connected to a second network, a second request for CORBA naming service, the second request being transmitted from the second client to a second IP address corresponding to the second network; and generating an object reference including a reference IP address, the object reference being required for the first or second client to access an object, wherein the generating includes receiving connection information including the first or second IP address and the first or second request for CORBA naming service, determining whether the first or second IP address is a predetermined IP address, setting an IP address for load distribution as the reference IP address if it is determined that the first or second IP address is determined to be the predetermined IP address, and setting the first or second IP address as the reference IP address if it is determined that the first or second IP address is not determined to be the predetermined IP address.

7. A computer readable recording medium storing instructions which causes a computer to perform the method, the method comprising:

receiving, via a server having a server IP address, a request for Common Object Request Broker Architecture (CORBA) naming service, the request being transmitted by a first client to an arrival IP address; and generating a CORBA object reference including a reference IP address, the CORBA object reference being required for the first client to access an object;

wherein the generating includes receiving the request and connection information including the arrival IP address, determining whether the arrival IP address is a predetermined IP address, setting the server IP address as the reference IP address if the arrival IP address is determined to be the predetermined IP address, and setting an IP address other than the server IP address as the reference IP address if the arrival IP address is not determined to be the predetermined IP address.

8. A computer readable recording medium according to claim 7, further comprising:

controlling system structure information that indicates a relationship between the predetermined IP address and the server IP address, wherein the generating further includes referring to the system structure information to make the determination and generate the CORBA object reference.

9. A computer readable recording medium storing instructions which causes a computer to perform a method, the method comprising:

receiving, from a first client connected to a first network, a first request for CORBA naming service, the first request being transmitted from the first client to a first IP address corresponding to the first network, and from a second client connected to a second network, a second request for CORBA naming service, the second request being transmitted from the second client to a second IP address corresponding to the second network; and generating an object reference including a reference IP address, the object reference being required for the first or second client to access an object, wherein the generating includes receiving connection information including the first or second IP address and the first or second request for CORBA naming service, determining whether the first or second IP address is a predetermined IP address, setting an IP address for load distribution as the reference IP address if it is determined that the first or second IP address is determined to be the predetermined IP address, and setting the first or second IP address as the reference IP address if it is determined that the first or second IP address is not determined to be the predetermined IP address.

* * * * *